United States Patent Office.

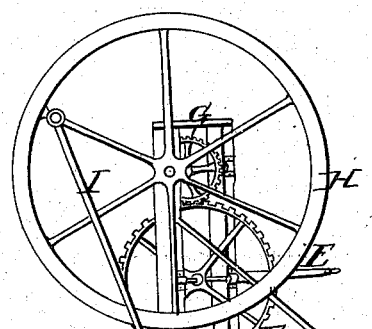
W. M. Cochran,
Sawing Machine,
No. 105,910. Patented Aug. 2, 1870.
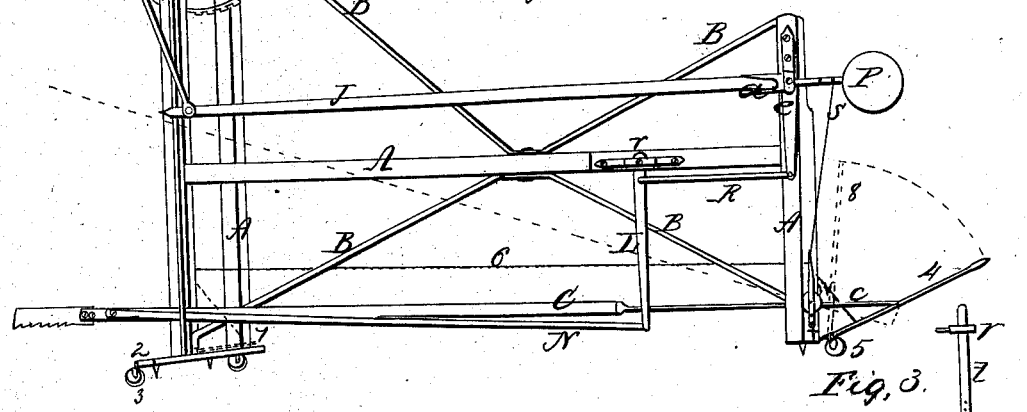
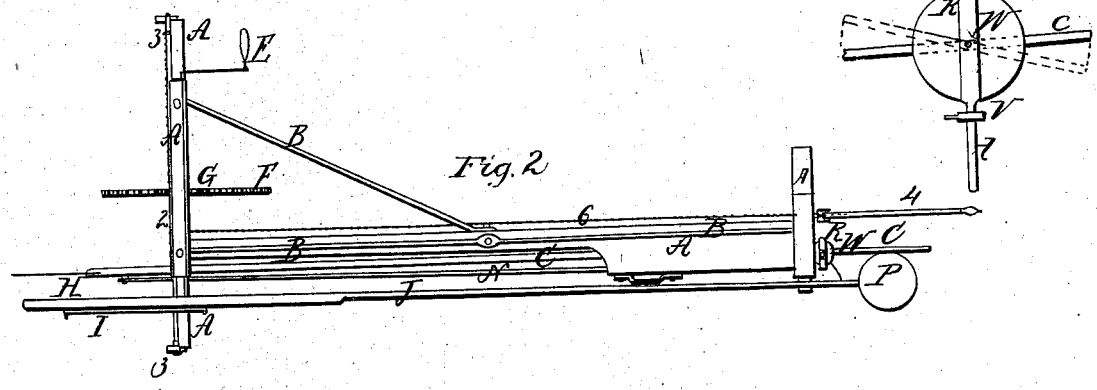
Witnesses,
O. F. Mayhew.
John Pollitt.
Inventor,
Wm. M. Cochran

WILLIAM M. COCHRAN, OF INDIANAPOLIS, INDIANA.

Letters Patent No. 105,910, dated August 2, 1870.

IMPROVEMENT IN SAWING-MACHINE.

The Schedule referred to in these Letters Patent and making part of the same.

I, WILLIAM M. COCHRAN, of Indianapolis, in the county of Marion and State of Indiana, have invented certain Improvements in Hand Sawing-Machines, of which the following is a specification.

Nature and Objects of the Invention.

The first part of my invention consists in the arrangement and combination of gearing, connecting-rods, and levers, for giving reciprocating motion to the saw, combined with the arrangement of a vertical reciprocating and oscillating guide for giving to it a rocking motion.

The second part of my invention consists in the construction and arrangement of the bent axle and trucks, on which one end of the machine is mounted, and the lever-tongue and caster-wheel at the other end, the two being constructed in such a manner as to enable me to raise the machine when it is necessary to draw it forward, and to let it down so as to rest firmly on the ground when in position to be operated.

Description of the Accompanying Drawing.

Figure 1 is a side elevation of a sawing-machine embodying my invention.
Figure 2 is a plan view of the same.
Figure 3 is an enlarged detached view of the rocking-guide.

General Description.

A is the frame-work of the machine, to which all the other parts are attached.

B are braces to make the frame more substantial.

C is the saw-pitman, the rear end of which runs through an oscillating guide, D, designed to give a rocking motion to the saw, which will be more fully described hereafter.

Motion is communicated to the saw by means of a crank, E, on the shaft of spur-wheel F, said spur-wheel gearing with a smaller spur-wheel, G, on the shaft of which is a combined crank and fly-wheel H.

A connecting-rod, I, connects the crank-wheel H with a horizontal lever, J, said lever being pivoted to the frame at $a$, and having a downward-projecting short arm, $e$.

A connecting-rod, K, connects the lower end of short arm $e$ with a lever, L, the upper end of which is pivoted to the frame at $r$, and the lower end to the connecting-bar N, which extends to and is attached to the forward end of the saw-pitman C, as shown.

A weight, P, is attached to the rear projecting end of lever J, to balance the long part forward of the fulcrum at $a$, in order to prevent any jerking motion of the lever.

A rod, $s$, connects the rear projecting end of lever J, with a vertical reciprocating and oscillating guide, the latter consisting of a yoke, R, furnished with the stem $t$, to work in eyes $v$ to guide it in its vertical motion, the oscillating guide $w$ being pivoted in the yoke, as shown.

A bent axle, 2, having suitable trucks, 3, is hung to the lower forward timber of the frame, and a lever or tongue, 4, with a caster-wheel, 5, at the lower end, is hinged to the rear end of the frame, as shown.

A cord, 6, connects the lever 4 with a lever 7, attached to the bent axle 2.

When the lever or tongue 4 is turned up, as indicated by the dotted lines 8, the frame A rests upon the ground, but when it is turned down to serve as a tongue, the trucks raise the machine off the ground, when it may be moved with great facility to another position.

The dotted lines $x$ indicate the position of the saw-pitman when sawing logs of considerable size.

Claims.

I claim as my invention—

1. The construction and arrangement of the gearing F G, combined crank and fly-wheel H, connecting-rod I, lever J $e$, with its counterpoise P, connecting-rod K, lever L, connecting-rod N, saw-pitman C, and oscillating guide R $t$ W, substantially as and for the purpose set forth.

2. The bent axle 2, with its lever 7, hinged lever tongue 4, with its caster-wheel 5, and cord 6, arranged and operating substantially as set forth.

WM. M. COCHRAN.

Witnesses:
JOHN POLLITT,
O. F. MAYHEW.